Feb. 11, 1947. D. TAPPAN 2,415,614
SASH BALANCE
Filed Aug. 23, 1944 2 Sheets-Sheet 1
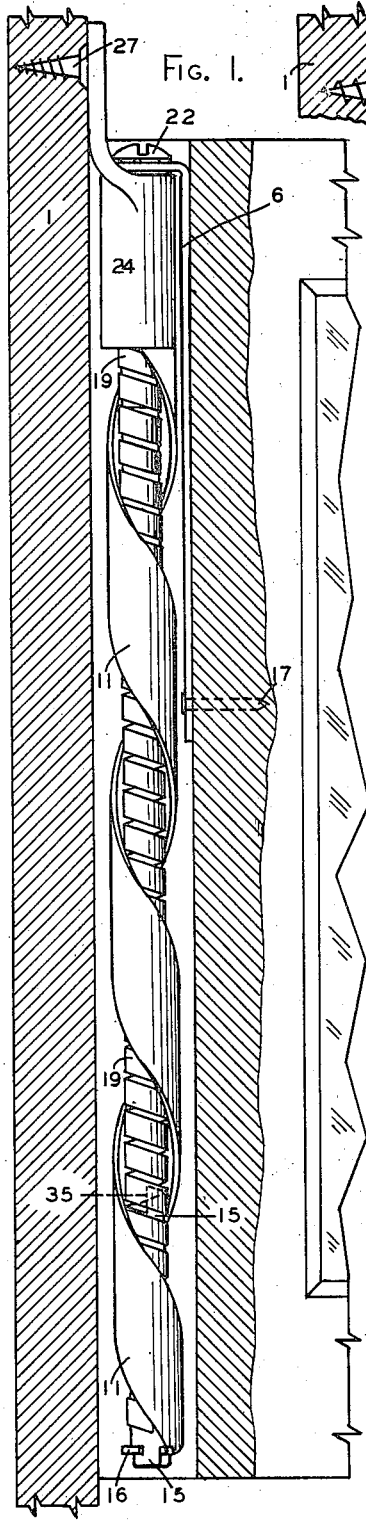
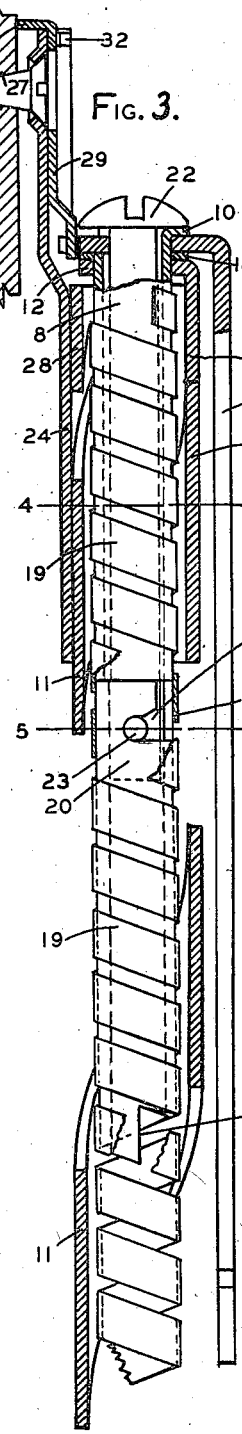
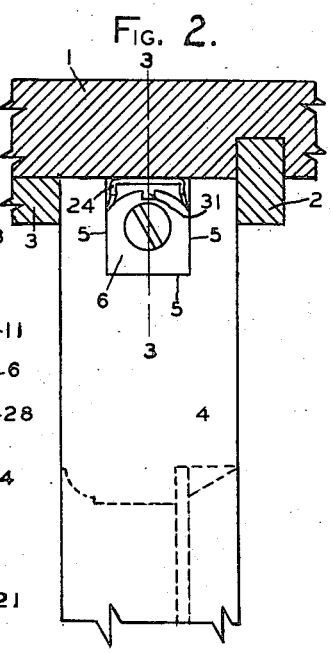
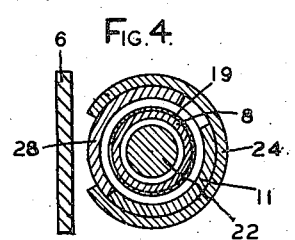
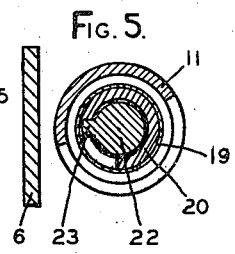
INVENTOR.
Dewitt Tappan Feb. 11, 1947. D. TAPPAN 2,415,614
SASH BALANCE
Filed Aug. 23, 1944 2 Sheets-Sheet 2

INVENTOR.
DeWitt Tappan

Patented Feb. 11, 1947

2,415,614

UNITED STATES PATENT OFFICE 2,415,614

SASH BALANCE

Dewitt Tappan, Irondequoit, N. Y.

Application August 23, 1944, Serial No. 550,713

18 Claims. (Cl. 16—197)

This invention relates to improvements in sash balances of the type arranged in the vertical side of a window sash and utilizing an elongated spiral member in cooperative engagement with an actuating member whereby downward movement of the sash causes rotative movement of the spiral member with respect to the actuating member and stores energy in a torsion spring to retain the sash in any position of its vertical travel and to assist in lifting the weight of the sash.

An object of the present invention is to provide a sash balance with a type of torsion spring that retains itself in a straight axial line between its anchorages when torsional force is applied to it without the assistance of a supporting rod within it, or the restraining effect of a tube outside of it, thereby avoiding the noise and friction encountered by the use of a conventional type of torsion spring and permitting the full torsional force stored in the spring to be available for quiet efficient operation of the balance.

Another object is to provide an improved adjusting means whereby a sash balance may be prewound, or energized, during manufacture; and in which the amount of energy stored in the spring may be adjusted to suit the weight of the window sash either before or after installation.

Another object of the present invention is to provide a sash balance with spring anchorages that promote alinement of the torsion spring.

Another object of the present invention is to provide a sash balance with locking means whereby the balance is easily mounted into a window while its spring is energized, and wherein such locking means is automatically released due to the act of attaching the balance to the frame of the window, thus allowing the force in the spring to become effective to operate the balance.

Another object of the present invention is to provide an adjustable sash balance with a removable key for operating the adjusting means, the removal of such key being effective to prevent unauthorized tampering with the adjustment of the torsional force within the spring.

Another object of the present invention is to provide a sash balance that may readily be taken apart for repairs without destroying, deforming or damaging any of the component parts.

Other objects, purposes, and characteristic features of the present invention will be in part obvious from the accompanying drawings, and in part pointed out as the description progresses.

In considering the present invention in detail, reference will be made to the accompanying drawings in which like reference characters are used to designate corresponding parts in the various figures, and in which:

Fig. 1 is a front elevational view partially in section showing the balance mounted between the vertical edge of a window sash and a window frame.

Fig. 2 is a plan view of the sash balance.

Fig. 3 is a foreshortened partial sectional view of the upper end of the balance taken along the line 3—3 in Fig. 2 with portions of the spring removed to show more clearly the adjustment feature.

Fig. 4 is a sectional view taken along the line 4—4 in Fig. 3.

Fig. 5 is a sectional view taken along the line 5—5 in Fig. 3.

Fig. 6 is a foreshortened partial sectional view of the upper end of the balance taken along the line 3—3 in Fig. 2 showing an alternate construction.

Fig. 7 is a side view of the actuating member.

Fig. 8 is an end view of the actuating member.

Fig. 9 is a view of the tubular member looking at the upper end.

Fig. 10 is a side view of the upper end of the tubular member.

Fig. 11 is a side view of the lower end of the tubular member.

Fig. 12 is an end view of the tubular member.

Fig. 13 is a detail of the lower spring anchor.

Fig. 14 is an end view of the lower spring anchor.

Fig. 15 is a detail of the locking piece.

Fig. 16 is a detail of the mounting bracket looking at the upper end.

Fig. 17 is a detail of the upper spring anchor before assembly.

Fig. 18 is an end view of the upper spring anchor.

Fig. 19 is a detail of the torsion adjuster.

Fig. 20 is an end view of the torsion adjuster.

Fig. 21 is a detail of the adjusting key.

Fig. 22 is an end view of the adjusting key.

In Figs. 1, 2 and 3 are shown parts of a conventional window sash and frame arranged to receive the sash balance herein described. 1 is a part of the window frame normally known as the jamb, 2 is the parting strip between the two sashes of a double hung window, and 3 is the stop. These three parts form a channel in which the sash 4 moves up and down. The sash 4 has a rectangular groove, the outline of which is shown at 5 in Fig. 2, formed in its vertical sides to receive the sash balance. It is the usual practice to use a sash balance in each side of both upper and lower sash of a double hung window, although under certain conditions a single balance for each sash is satisfactory. Since the balance herein described is interchangeable and may be used in either side of either upper or lower sash only one side of a window sash and its adjacent jamb are shown.

Part 6 is a supporting member formed from a rectangular strip of metal with a portion at the upper end formed at right angles to the main body portion and pierced with a sectored hole 7 in Fig. 16, through the horizontal portion. The main body portion of this supporting member is made of suitable width to fit into the bottom of channel 5 in the sash and preferably of suitable length to extend several inches down from the top of the sash so that it may flex somewhat to compensate for shrinkage of the sash and also to insure sound cross grain wood into which the securing nails 17 may be driven.

Part 8 Fig. 17 is a spring anchor consisting of a tubular member having lugs 9 on one end suitable to pass through the sectored hole 7 in the supporting member 6. The portions of the lugs 9 which extend through the hole 7 are bent over as shown at 10, Fig. 3 and Fig. 6, thus securing spring anchor 8 to supporting member 6 against endwise or rotative movement.

Part 11 is a tubular member having a spiral opening in its wall and having a portion of its wall 12 bent inward at right angles over its axis at its upper end with a hole 13 formed therein concentric with its axis and suitable to form a bearing whereby it may rotate on and about the spring anchor 8. At the lower end of this spiral member a portion of its wall 16 is likewise bent inward over its axis with the bent portion formed into a sectored shape concentric with its axis and suitable to engage with the hooked lugs 14 on the lower spring anchor 15 forming what is conventionally known as a bayonet type joint.

Part 18 is a washer placed between the supporting member 6 and the tubular member 11 to act as a thrust bearing.

Part 19 is a special type spring secured at one end to the spring anchor 8 and at the other end to the spring anchor 15. The desirable inherent properties of this special spring will be fully described herein later.

Spring anchor 15 is secured to the tubular member 11 by slipping the two hooked prongs 14 in Fig. 13, over the central portion of the sectored shape of the lower bent end of the tubular member, and then turned slightly and the hooks engaged over two of the radial edges of the sectored shape thus locking the anchorage 15 to the tubular member 11. Torsional force applied to spring 19 holds them in this locked position.

Operative engagement of spring 19 to anchors 8 and 15 is attained by making the inside diameter of the spring slightly less than the outside diameters of the anchors so that frictional contact is assured at all times. The spring may then be screwed onto the anchors, and since torsion force is applied to the spring in a direction that decreases its diameter, it grips fast to the anchors.

Part 20 is a torsion adjuster for increasing the torsion force of the spring to the desired amount. It also is made of suitable outside diameter so that there is normally frictional contact between its outside diameter and the inside of the spring. It is screwed into the spring, before the spring is assembled, to such a point where its outer end will butt against the spring anchor 8 on assembly. This torsion adjuster is preferably tubular in shape and formed of sheet metal with its inside diameter substantially less than that of spring anchor 8. In the wall at its upper end is formed an "L" shaped notch 21. Part 22 is an adjusting key, details of which are shown in Figs. 21 and 22. At its lower end is formed a lug 23 suitable in height so that it will just pass through the hole in the spring anchor 8. The key is entered into and passed through the hole through spring anchor 8 and the lug 23 engaged into the notch 21 of the torsion adjuster.

Part 24 is an actuating member. It is preferably formed of sheet metal with its lower end of tubular shape suitable to nearly surround the tubular member 11 as shown in Fig. 4. Its upper end is channel shaped as shown in Figs. 2 and 8. It has a hole 26 formed in it suitable for an attaching screw 27.

Part 28 is a spiral shaped section of a cylinder or tube, one of the radial walls of which forms a bearing with the cooperating radial wall of the tubular member 11. It is preferably made from a short piece of the spirally formed stock from which the tubular spiral member 11 is made. This structure insures a suitable bearing of the same pitch. Part 28 is secured into operating member 24 by welding or other suitable means.

Part 29 is a locking piece the function of which is to hold supporting member 6 and operating member 24, against the torsional force of the spring, in the proper position for mounting the completed balance into the window. It has a lug 30 suitable for entering into and engaging with notch 31 in the supporting member 6. This engagement is shown in section in both Figs. 3 and 6. The width of this locking piece is such that it fits snugly into the channeled end of the operating member 24, and it is secured there preferably by shearing down a portion of each wall of the channel and pressing the metal thereby displaced down against the locking piece firmly with a suitable tool. This is shown at 32 in Figs. 3 and 6. This locking piece also has a hole 34 formed in it suitable for the head of the attaching screw 27 to pass freely through it.

As will be seen at 33 in Figs. 3 and 6, part 29 has its upper end bent at right angles so that it extends over and beyond the end of the actuating member 24. On mounting the balance into the window this bent lug 33 bears against the jamb 1, and as the attaching screw 27 is driven home, pressure of the lug 33 against the jamb forces the locking piece out of its anchorage at 32 and it falls away and is discarded, the proper relation of the supporting member 6 and the actuating member 24 being then maintained by their respective securing means to the sash and frame of the window. This locking piece 29 may also be made without the bent lug 33 and removed from its engagement by sliding upward on upward movement of the sash, or by prying out with a suitable tool.

Referring now to the desirable properties of spring 19, it is well-known to the art that a torsion spring of the conventional type made of round or square wire will kink, buckle and depart from a straight axial line on the application of torsional force, and for this reason a supporting rod within, or a restraining tube without, is necessary. The friction between the portions of the spring contacting the rod or tube, or both, particularly where a considerable amount of rotative movement is required, as is the case in this type mechanism, consumes a large portion of the energy of the spring. Also the movement of these contacting points under rotation is the source of undesirable noise in the operation of the balance. It is also well known that an involute spring of the type commonly known as a "clock spring" is the most satisfactory type of spring for transmitting rotative motion. In my efforts to approach more nearly the desirable qualities of an involute spring and avoid deviation from the axial line under torsional force I developed the spring I use in this improved sash balance. I use material greater in width than thickness similar in cross section to that used in an involute clock spring. Such material will bend, or flex, in its thin dimension only and when coiled into the form of a helix with the greater cross section dimension parallel to the axis of the helix there will be what, for the purposes of this description and the appended claims, may be called "lines of flexure" parallel to the axis of the spring whereby the tendency to kink, or buckle, under applied torsional force is avoided.

Extensive comparative tests were made, weighing the foot pounds of force exerted for each turn of torsional movement added and it was found that while the force curve developed was not as uniform, or level, in this new spring as in an involute spring it was decidedly superior to a spring of equal cross section area made of round or square wire. It will be clear from the foregoing that the use of a spring of this character contributes three distinct improvements to sash balances of the type herein described. First, it avoids friction due to moving contact with other parts and thereby increases the effective force of the spring; secondly, it is quiet in operation; and thirdly, its force varies less during the amount of rotative movement necessary.

Referring to Figs. 13 and 19 it will be seen that the lower end of the torsion adjuster 20 and the upper end of the spring anchor 15 terminate in a spiral approximately equal to the pitch of spring 19, and that there is a step, or edge, 35 which is parallel to the axis of the tubes of which these parts consist. The function of these parallel edges is twofold. First, they form supports for the spring at the points where it leaves its anchorages that are parallel to the axis of the spring, and therefore avoids deflecting the spring from a straight axial line at these points. Second, it eliminates any tendency for the spring to work off the anchorages due to its change in diameter when operating.

Referring now to Fig. 3 for consideration of the functioning of the adjusting features, it will be noted that spring 19 is in frictional contact with the outside diameters of both spring anchor 8 and torsion adjuster 20, and that adjusting key 22 is connected to the torsion adjuster by means of lug 23 engaging with the L shaped notch 21. Spring 19 is shown formed with a lefthand spiral. Therefore, if adjusting key 22 is turned in a clockwise direction, while looking at its upper end, that portion of the spring bearing on the torsion adjuster 20 will grip fast to it, being in effect pulled upon, and that portion of the spring bearing on the stationary spring anchor 8 being in effect pushed rather than pulled, will relax its grip on anchor 8 and rotate about it. As soon as the turning force applied to key 22 is released, the torsional force of the spring increases frictional contact between spring 19 and anchor 8 causing the spring to grip fast to the spring anchor 8. Thus, it will be seen that there are an infinite number of radial positions the spring may be caused to assume on the spring anchor, and therefore any desired amount of torsional force may be applied to the spring, it being understood that the lower end of the spring is secured to the lower end of the tubular member 11 against rotation with respect to it by means of spring anchor 15 and its bayonet lock engagement with the tubular member. From this it will be clear that spring 19 performs two separate functions. The upper end in engagement with anchor 8 and torsion adjuster 20 acts as an adjustment retaining member, while the free portion between the torsion adjuster and the lower spring anchor 15 acts as a source of power for operating the balance.

Referring now to Fig. 6 which is an alternate construction wherein spring 19 has but one function, namely to act as a source of power, and an additional spring 36 is utilized as an adjustment retaining member only. In this construction the adjustment is attained in the same manner as in the construction shown in Fig. 3 except that while turning the adjusting key 22 for adjustment, the adjustment retaining member 36 may slip either on spring anchor 8, or on torsion adjuster 20, or both.

It should be obvious from the descriptions of these two constructions of the adjusting feature that it is possible to make an operative construction by either extending spring 36 downward and connecting it to spring anchor 15, or by extending spring 19 upward and engaging it with spring anchor 8. In fact the latter is what was done in the preferred construction shown in Fig. 3.

To mount the balance in a window, assuming that the spring has been tensioned during manufacture, it is placed in the rectangular channel in the side of the sash with the operating member 24 at an upper corner and extending beyond the sash to afford access to the securing screw 27, and then secured to the sash by driving nails into the sash through holes, or notches, in the supporting member 6. Then the sash is put in its frame and placed at its lowest operative position and the operating member 24 secured to the window frame. As stated heretofore, the act of driving screw 27 home releases locking piece 29 and it is discarded. The balance is now properly mounted and the torsion of the spring is at its maximum. As the sash is raised the torsional force stored in spring 19 acting to rotate the tubular spiral member 11 causes the tubular spiral member to climb upward through the operating member 24 and thrusting against the bearing 18 and the supporting member 6 assists in raising the window sash. When the sash has been raised to its uppermost limit of travel a portion of the energy stored in spring 19 has been expended due to the rotation of the tubular spiral member 11. If it was properly tensioned during manufacture for that particular sash there should be sufficient force remaining in the spring to retain the sash at its highest position. If not, and if the sash drops some when released, additional torsional force is applied to the spring by turning adjusting key 22. When the sash is lowered to its lowest position of travel the direction of rotation of the tubular spiral member is reversed by action of operating member 24 and the energy of spring 19 is thereby increased to its maximum.

If it is desired to prevent unauthorized tampering with the torsional adjustment of the spring, the adjusting key 22 may be removed by turning it backward slightly and pulling it out.

While the invention has been described with reference to the structural details disclosed, it is not confined to this particular embodiment, and the application is intended to cover any modifications or departures coming within the purposes of the improvements and the scope of the following claims.

I claim:

1. In a sash balance comprising an elongated spiral member; an actuating member in cooperative engagement with said elongated spiral member to promote rotative movement of one with respect to the other on longitudinal movement of one with respect to the other; an elongated helical spring wherein torsional force may be stored for transmitting rotary motion, such spring being constructed of resilient material substantially greater in width than thickness and coiled in a helical form with the greater cross section dimension parallel to the axis of the spring, the difference between the width and the thickness of such material being sufficient to cause lines of flexure parallel to the axis of the spring, whereby such spring will retain a straight axial line when torsional force is applied to it; means for securing one end of said spring against rotative movement; and means for securing the opposite end of such spring to resist rotative movement of said elongated spiral member with respect to said actuating member in one direction and to promote rotative movement thereof in the opposite direction.

2. In a sash balance comprising an elongated spiral member; an actuating member in cooperative engagement with said elongated spiral member to promote rotative movement of one with respect to the other on longitudinal movement of one with respect to the other; an elongated helical spring wherein torsional force may be stored for transmitting rotary motion, such spring being constructed of resilient material substantially greater in width than thickness and coiled in a helical form with the greater cross section dimension parallel to the axis of the spring, the difference between the width and the thickness of such material being sufficient to cause lines of flexure parallel to the axis of the spring whereby such spring will retain a straight axial line when torsional force is applied to it; a spring anchor for securing one end of said spring against rotative movement; a second spring anchor for securing the opposite end of such spring to resist rotative movement of said elongated spiral member with respect to said actuating member in one direction and to promote rotative movement thereof in the opposite direction; and adjustable securing means in frictional contact with one of said spring anchors and one end of said spring, such adjustable means being effective by frictional contact of said spring and that spring anchor to permit rotation of said spring in a given direction and to secure such spring against rotation in the opposite direction with respect to such spring anchor thereby adjusting the torsional force within said spring.

3. In a sash balance of the character described comprising a supporting member for securing the balance to a window sash; a tubular member having a spiral opening in its wall and a bearing at one end; a spring anchor extending through the bearing in said tubular member and secured to said supporting member against rotative movement; a second spring anchor secured to the opposite end of said tubular member and held against rotation with respect to such member; an elongated helical spring with its ends secured to said first and said second spring anchors respectively, such spring being formed of a strip of resilient material greater in width than its thickness coiled in a helical form with the greater cross section dimension parallel to the axis of the spring, the difference between the width and the thickness of such material being sufficient to cause lines of flexure parallel to the axis of the spring, whereby such spring will retain a straight axial line when torsional force is applied to it; and an actuating member for securing to a window frame adapted to engage said spiral opening in the wall of said tubular member to cause rotation thereof.

4. A sash balance of the character described comprising a supporting member for securing the balance to a window sash; a tubular member having a spiral opening in its wall and a bearing at one end; a spring anchor extending through the bearing in said tubular member and secured at its upper end to said supporting member against rotative movement, the lower end of said spring anchor terminating in a form that leaves an edge parallel to its axis; a second spring anchor secured at its lower end to the opposite end of said tubular member and held against rotation with respect to such member, the upper end of said second spring anchor terminating in a form that leaves an edge parallel to its axis; a spring inside said tubular member with its ends secured to said first and said second spring anchors respectively, such spring being formed of a strip of resilient material substantially greater in width than its thickness wherein lines of flexure exist that are parallel to the axis of the spring and whereby the free portion of such spring between the aforesaid first and second spring anchors maintains itself in a straight axial line under torsional strain, and wherein the parallel edges of said first and said second spring anchors contribute to the axial alinement of said spring at the points of its departure from said spring anchors; and an actuating member for securing to a window frame adapted to engage said spiral opening in the wall of said tubular member to cause rotation thereof.

5. A sash balance of the character described comprising a supporting member for securing the balance to a window sash; a tubular member having a spiral opening in its wall and a bearing at one end; a spring anchor extending through the bearing in said tubular member and secured to said supporting member against rotative movement; a second spring anchor secured at one end to the opposite end of said tubular member and held against rotation with respect to such member, the opposite end of said second spring anchor terminating in a form that leaves an edge parallel to its axis; a spring inside said tubular member with its ends secured to said first and said second spring anchors respectively, such spring being formed of a strip of resilient material substantially greater in width than its thickness wherein lines of flexure exist that are parallel to the axis of the spring and whereby axial alinement of such spring is promoted, and wherein the parallel edge of said second spring anchor contributes to the axial alinement of said spring at the point of its departure from said second spring anchor; and an actuating member for securing to a window frame adapted to engage said spiral opening in the wall of said tubular member to cause rotation thereof.

6. A sash balance of the character described comprising a supporting member for securing the balance to a window sash; a tubular member having a spiral opening in its wall and a bearing at one end; a spring anchor extending through the bearing in said tubular member and secured at one end to said supporting member against rotative movement, the opposite end of such spring anchor terminating in a form that leaves an edge parallel to its axis; a second spring anchor secured to the opposite end of said tubular member and held against rotation with respect to such member; a spring inside said tubular member with its ends secured to said first and said second spring anchors respectively, such spring being formed of a strip of resilient material substantially greater in width than its thickness wherein lines of flexure exist that are parallel to the axis of the spring and whereby axial alinement of such spring under torsional force is promoted, and wherein the parallel edge of said first spring anchor contributes to the axial alinement of said spring at the point of its departure from said first spring anchor; and an actuating member for securing to a window frame adapted to engage said spiral opening in the wall of said tubular member to cause rotation thereof.

7. A sash balance of the character described comprising a supporting member for securing the balance to a window sash, a first spring anchor in non-rotative engagement with such supporting member, a second spring anchor, a tubular member having a spiral opening in its wall and a portion of its wall at the upper end bent inward across the axis of such tubular member and a bearing formed therein in rotative engagement with said first spring anchor and a portion of the wall at the lower end of said tubular member bent inward across its axis and formed to be non-rotatively engaged with said second spring anchor, a spring inside said tubular member with its ends secured to said first and said second spring anchors respectively, and an actuating member for securing to a window frame adapted to engage said spiral opening in the wall of said tubular member to cause rotation thereof.

8. In a sash balance of the character described comprising a supporting member for securing the balance to a window sash, a tubular member having a spiral opening in its wall and a bearing at one end, a first spring anchor extending through the bearing in said tubular member and secured to said supporting member against rotative movement, a spring inside said tubular member with one end secured to said first spring anchor, a second spring anchor having one end secured to said spring and its other end secured in non-rotative engagement with respect to said tubular member such engagement being maintained only by torsional force within said spring, and an actuating member for securing to a window frame adapted to engage said spiral opening in the wall of said tubular member to cause rotation thereof.

9. A sash balance of the character described comprising a supporting member for securing the balance to a window sash; a tubular member having a spiral opening in its wall, a bearing at one end and its opposite end formed to receive a spring anchor; an actuating member for securing to a window frame adapted to engage said spiral opening in the wall of said tubular member to cause rotation thereof; a first spring anchor extending through the bearing in said tubular member and secured against rotative movement; a second spring anchor having hooks formed on one end, such hooks being in engagement with the formed end of said tubular member against rotation with respect to such tubular member in a given direction; and a helical spring wherein torsional force may be stored inside said tubular member with its ends secured to said first spring anchor and said second spring anchor respectively, the engagement of said hooks on said second spring anchor with the formed end of said tubular member being maintained by torsional force within said spring.

10. A sash balance of the character described comprising a supporting member for securing the balance to a window sash, a tubular member having a spiral opening in its wall and a bearing at one end, a first spring anchor extending through the bearing in said tubular member and secured to said supporting member against rotative movement, a spring inside said tubular member, means including a second spring anchor for securing one end of said spring to rotate with said tubular member, adjustable securing means dependent only upon frictional contact with said first spring anchor and the opposite end of said spring whereby such frictional contact with said first spring anchor may be released to permit rotation of that end of such spring in a given direction and secured against rotation in the opposing direction, thereby adjusting the torsional force within said spring, and an actuating member for securing to a window frame adapted to engage said spiral opening in the wall of said tubular member to cause rotation thereof.

11. A sash balance of the character described comprising a supporting member for securing the balance to a window sash; a tubular member having a spiral opening in its wall and a bearing at one end; a first spring anchor extending through the bearing in said tubular member and secured to said supporting member against rotative movement; a second spring anchor secured to the opposite end of said tubular member and held against rotation with respect to such member; a spring inside said tubular member with its upper end in frictional engagement with said first spring anchor and its lower end secured to said second spring anchor; a torsion adjuster inside and secured to said spring against rotation in a given direction and in axial alinement with and adjacent to said first spring anchor; adjusting means extending through said first spring anchor and engaging with said torsion adjuster to transmit rotative movement to it in a given direction thereby causing said spring to rotate with said torsion adjuster about said first spring anchor and adjust the torsional force within said spring; and an actuating member for securing to a window frame adapted to engage said spiral opening in the wall of said tubular member to cause rotation thereof.

12. A sash balance of the character described comprising a supporting member for securing the balance to a window sash; a tubular member having a spiral opening in its wall and a bearing at one end; a first spring anchor extending through the bearing in said tubular member with its upper end secured to said supporting member against rotative movement; a torsion adjuster in axial alinement with and adjacent to said spring anchor; an adjustment retaining member in frictional engagement with the lower end of said spring anchor and the upper end of said torsion adjuster to resist rotative movement with respect to each other in a given direction; a second spring anchor secured to the lower end of said tubular member and held against rotation with respect to such member; a spring inside said tubular member with its ends engaged to said torsion adjuster and said second spring anchor respectively; adjusting means extending through said first spring anchor and engaging with said torsion adjuster to transmit rotative movement to it in a given direction and decrease the friction of contact between said adjustment retaining member, said first spring anchor and said torsion adjuster, and permit said adjustment retaining member to rotate about said first spring anchor, or said torsion adjuster, and thereby adjust the torsional force within said spring; and an actuating member for securing to a window frame adapted to engage said spiral opening in the wall of said tubular member to cause rotation thereof.

13. A sash balance of the character described comprising a supporting member for securing the balance to a window sash; a tubular member having a spiral opening in its wall and a bearing at one end; an actuating member for securing to a window frame adapted to engage said spiral opening in the wall of said tubular member to cause rotation thereof; a first spring anchor extending through the bearing in said tubular member and secured to said supporting member against rotative movement; a second spring anchor secured to the opposite end of said tubular member and held against rotation with respect to such member; a torsion adjuster in axial alinement with and adjacent to said first spring anchor, the lower end of such torsion adjuster terminating in a form that leaves an edge parallel to its axis; adjusting means for extending through said first spring anchor and engaging with said torsion adjuster; and a spring inside said tubular member having its lower end secured to said second spring anchor to rotate therewith and having the inside diameter of its upper end in frictional contact with the outside diameters of said torsion adjuster and said first spring anchor, said spring being constructed of a strip of resilient material greater in width than its thickness coiled in a helical form with the greater cross section dimension parallel to the axis of the spring, the difference between the width and the thickness of such material being sufficient to cause lines of flexure parallel to the axis of the spring whereby such spring will retain a straight axial line when torsional force is applied to it, and wherein the parallel edge of said torsion adjuster contributes to the axial alinement of such spring at the point of its departure from the torsion adjuster.

14. A sash balance of the character described comprising a supporting member for securing the balance to a window sash; a tubular member having a spiral opening in its wall and a bearing at one end; an actuating member for securing to a window frame adapted to engage the spiral opening in the wall of said tubular member to cause rotation thereof; a first spring anchor extending through the bearing in said tubular member and secured to said supporting member against rotative movement; a second spring anchor secured to the opposite end of said tubular member and held against rotation with respect to such member; a torsion adjuster in axial alinement with and adjacent to said first spring anchor, the lower end of such torsion adjuster terminating in a form that leaves an edge parallel to its axis; an adjustment retaining member in frictional engagement with the lower end of said first spring anchor and the upper end of said torsion adjuster; adjusting means extending through said first spring anchor and engaging with said torsion adjuster; and a spring inside said tubular member with its ends secured to said torsion adjuster and said second spring anchor respectively, such spring being constructed of a strip of resilient material greater in width than its thickness and coiled in a helical form with the greater cross section dimension parallel to the axis of the spring, the difference between the width and the thickness of such material being sufficient to cause lines of flexure parallel to the axis of the spring whereby such spring will retain a straight axial line when torsional force is applied to it, and wherein the parallel edge of said torsion adjuster contributes to the axial alinement of such spring at the point of its departure from the torsion adjuster.

15. A sash balance of the character described comprising a supporting member for securing the balance to a window sash; a tubular member having a spiral opening in its wall and a bearing at one end, a first spring anchor extending through the bearing in said tubular member and secured to said supporting member against rotative movement; a second spring anchor secured to the opposite end of said tubular member and held against rotation with respect to such member; a spring inside said tubular member with its end coils in engagement with said first and said second spring anchors respectively; means for adjusting the torsional force within said spring, a portion of such means being removable to prevent unauthorized changing of said torsional force in said spring; and an actuating member for securing to a window frame adapted to engage said spiral opening in the wall of said tubular member to cause rotation thereof.

16. A sash balance of the character described comprising a supporting member for securing the balance to a window sash; a tubular member having a spiral opening in its wall rotatably mounted on said supporting member; an actuating member, including securing means for attaching such member to a window frame, adapted to engage said spiral opening in the wall of said tubular member to cause rotation thereof; a spring inside said tubular member; means for securing one end of such spring against rotative movement and means for securing the opposite end to rotate with said tubular member; and removable locking means for maintaining alinement between said supporting member and said actuating member until the balance has been mounted in operational connection with a window sash and a window frame, such locking means being adapted to be mechanically disengaged by the attachment of said actuating member to the window frame.

17. In a sash balance comprising an elongated spiral member; an actuating member in cooperative engagement with said elongated spiral member to promote rotative movement of one with respect to the other on longitudinal movement of one with respect to the other; an elongated helical spring wherein torsional force may be stored for transmitting rotary motion; a first spring anchor for securing one end of said spring against rotative movement; a second spring anchor for securing the opposite end of such spring to resist rotative movement of said elongated spiral member with respect to said actuating member in one direction and to promote rotative movement thereof in the opposite direction; a torsion adjusting member within said spring adjacent to one of said spring anchors, such adjusting member being secured to said spring against rotation in a given direction; and rotative means extending through one of said spring anchors and engaging said adjusting member whereby such adjusting member may be rotated in a given direction and the end of said spring, to which said adjusting member is secured, thereby rotated about the adjacent spring anchor to adjust the torsional force of said spring.

18. In a sash balance comprising an elongated spiral member; an actuating member in cooperative engagement with said elongated spiral member to promote rotative movement of one with respect to the other on longitudinal movement of one with respect to the other; an elongated helical spring wherein torsional force may be stored for transmitting rotary movement, such spring being formed of resilient material greater in width than its thickness; a first spring anchor for securing one end of said spring against rotative movement; a second spring anchor for securing the opposite end of such spring to resist rotative movement of said elongated spiral member with respect to said actuating member in one direction and to promote rotative movement thereof in the opposite direction; the ends of said first and second spring anchors to which said spring is secured terminating in a form that leaves an edge parallel to the axis of said first and second spring anchors and said spring.

DEWITT TAPPAN.

REFERENCES CITED

The following references are of record in the file of this patent:

UNITED STATES PATENTS

| Number | Name | Date |
|---|---|---|
| 2,365,156 | Viehweger | Dec. 19, 1944 |
| 2,370,867 | Luce | Mar. 6, 1945 |
| 1,926,951 | Larson | Sept. 12, 1933 |
| 2,329,463 | Froelich | Sept. 14, 1943 |
| 2,335,816 | Tappan | Nov. 30, 1943 |